(12) United States Patent
Li et al.

(10) Patent No.: US 11,184,635 B2
(45) Date of Patent: Nov. 23, 2021

(54) METHOD AND APPARATUS FOR VIDEO CODING WITH MOTION VECTOR CONSTRAINTS

(71) Applicant: Tencent America LLC, Palo Alto, CA (US)

(72) Inventors: Xiang Li, Saratoga, CA (US); Meng Xu, San Jose, CA (US); Xiaozhong Xu, State College, PA (US); Shan Liu, San Jose, CA (US); Guichun Li, Milpitas, CA (US)

(73) Assignee: Tencent America LLC, Palo Alto, CA (US)

( * ) Notice: Subject to any disclaimer, the term of this patent is extended or adjusted under 35 U.S.C. 154(b) by 40 days.

(21) Appl. No.: 16/517,156

(22) Filed: Jul. 19, 2019

(65) Prior Publication Data

US 2020/0077115 A1 Mar. 5, 2020

Related U.S. Application Data

(60) Provisional application No. 62/725,927, filed on Aug. 31, 2018, provisional application No. 62/734,987, filed on Sep. 21, 2018, provisional application No. 62/788,838, filed on Jan. 5, 2019.

(51) Int. Cl.
*H04N 19/513* (2014.01)
*H04N 19/44* (2014.01)
*H04N 19/176* (2014.01)

(52) U.S. Cl.
CPC .......... *H04N 19/521* (2014.11); *H04N 19/44* (2014.11)

(58) Field of Classification Search
CPC .... H04N 19/52; H04N 19/103; H04N 19/119; H04N 19/159; H04N 19/176; H04N 19/70; H04N 19/91; H04N 19/96; H04N 19/124
See application file for complete search history.

(56) References Cited

U.S. PATENT DOCUMENTS

| | | | | |
|---|---|---|---|---|
| 10,873,760 | B2 * | 12/2020 | Chen | H04N 19/139 |
| 2018/0192071 | A1 * | 7/2018 | Chuang | H04N 19/517 |
| 2018/0295381 | A1 * | 10/2018 | Chen | H04N 19/105 |

(Continued)

OTHER PUBLICATIONS

High Efficiency Video Coding, Rec. ITU-T H.265v4, Dec. 2016.

(Continued)

*Primary Examiner* — Boubacar Abdou Tchoussou
(74) *Attorney, Agent, or Firm* — Oblon, McClelland, Maier & Neustadt, L.L.P.

(57) ABSTRACT

An apparatus includes processing circuitry that obtains motion information of a group of blocks in a picture from a coded video bitstream, the motion information indicating base motion vectors for the group of blocks, and the base motion vectors pointing to a reference picture in a prediction list. The processing circuitry determines a range of target motion vectors for the group of blocks along a particular coordinate direction according to the base motion vectors and a target difference, where, for any two motion vectors within the range, a difference of integer-pixel parts thereof along the particular coordinate direction is equal to or less than the target difference. The processing circuitry further converts the base motion vectors into the target motion vectors according to the range for reconstructing samples of the group of blocks.

19 Claims, 13 Drawing Sheets

(56) References Cited

U.S. PATENT DOCUMENTS

| | | | |
|---|---|---|---|
| 2018/0316929 A1* | 11/2018 | Li | H04N 19/573 |
| 2019/0045215 A1* | 2/2019 | Chen | H04N 19/577 |
| 2020/0280735 A1* | 9/2020 | Lim | H04N 19/176 |

OTHER PUBLICATIONS

B. Bross, J. Chen, S. Liu, "Versatile Video Coding (Draft 2)", ISO/IEC JTC1/SC29/WG11 JVET-K1001, Jul. 2018.

S. Esenlik, Y.-W. Chen, F. Chen, "Description of Core Experiment 9 (CE9): Decoder Side Motion Vector Derivation", ISO/IEC JTC1/SC29/WG11 JVET-K1029, Jul. 2018.

H. Yang, S. Liu, K. Zhang, "Description of Core Experiment 4 (CE4): Inter prediction and motion vector coding", ISO/IEC JTC1/SC29/WG11 JVET-J1024, Jul. 2018.

* cited by examiner

METHOD AND APPARATUS FOR VIDEO CODING WITH MOTION VECTOR CONSTRAINTS

INCORPORATION BY REFERENCE

This present disclosure claims the benefit of priority to U.S. Provisional Application No. 62/725,927, "SUB-BLOCK MOTION VECTOR CONSTRAINTS" filed on Aug. 31, 2018; U.S. Provisional Application No. 62/734, 987, "IMPROVED SUB-BLOCK MOTION VECTOR CONSTRAINTS" filed on Sep. 21, 2018; and U.S. Provisional Application No. 62/788,838, "AFFINE MOTION VECTOR CLIPPING" filed on Jan. 5, 2019. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus includes processing circuitry that obtains motion information of a group of blocks in a picture from a coded video bitstream, the motion information indicating base motion vectors for the group of blocks, and the base motion vectors pointing to a first reference picture in a first prediction list. The processing circuitry determines a first range of target motion vectors for the group of blocks along a first coordinate direction according to the base motion vectors and a first target difference for the first coordinate direction, where, for any two motion vector within the first range, a difference of integer-pixel parts thereof along the first coordinate direction is equal to or less than the first target difference. The processing circuitry further converts the base motion vectors into the target motion vectors according to the first range, and generates reconstructed samples of the group of blocks for output based on the target motion vectors.

In some embodiments, the group of blocks includes sub-blocks of a coding block in the picture.

In some embodiments, the processing circuitry determines one of an upper bound value and a lower bound value of the first range according to one or more base motion vectors for one or more particular blocks in the group of blocks, the one or more particular blocks corresponding to a respective one or more predetermined positions in the coding block. The processing circuitry further determines the other one of the upper bound value and the lower bound value of the first range according to the determined one of the upper bound value and an integer-pixel portion of the lower bound value, the first target difference, and a precision setting of the target motion vectors. The pro processing circuitry converts the base motion vectors into the target motion vectors by clipping a first value of another base motion vector, along the first coordinate direction, for another block in the group of blocks to the lower bound value when the first value is less than the lower bound value, and by clipping the first value to the upper bound value when the first value is greater than the upper bound value.

In some embodiments, the group of blocks includes four 4×4 sub-blocks within a 8×8 block area in the picture.

In some embodiments, the one or more particular blocks consist of a first block in the group of blocks according to a scanning order. In some embodiments, the one or more particular blocks consist of first two blocks in the group of blocks according to a scanning order.

In some embodiments, the one or more particular blocks include all blocks in the group of blocks. In some embodiments, the processing circuitry determines the first range of the target motion vectors for the group of blocks along the first coordinate direction by performing one of (i) determining the upper bound value of the first range according to a maximum value of the base motion vectors, along the first coordinate direction, for the group of blocks, and (ii) determining the lower bound value of the first range according to a minimum value of the base motion vectors, along the first coordinate direction, for the group of blocks.

In some embodiments, the processing circuitry determines the first range of the target motion vectors for the group of blocks along the first coordinate direction by determining a maximum value of the base motion vectors, along the first coordinate direction, for the group of blocks, and determining a minimum value of the base motion vectors, along the first coordinate direction, for the group of blocks. In some embodiments, the processing circuitry determines the first range of the target motion vectors for the group of blocks along the first coordinate direction by, in response to a determination that a first difference between the minimum value and a first integer-pixel part of the minimum value is less than a second difference between the maximum value and a second integer-pixel part of the maximum value, (i) determining the lower bound value of the first range according to the minimum value of the base motion vectors, and (ii) determining the upper bound value of the first range according to an integer-pixel portion of the determined lower bound value, the first target difference, and a precision setting of the target motion vectors. In some embodiments, the processing circuitry determines the first range of the target motion vectors for the group of blocks along the first coordinate direction by, in response to a determination that the first difference is not less than the second difference, (i) determining the upper bound value of the first range according to the maximum value of the base motion vectors, and (ii) determining the lower bound value of the first range according to an integer-pixel portion of the determined upper bound value, the first target difference, and the precision setting of the target motion vectors.

In some embodiments, the processing circuitry determines the first target difference according to a size and a shape of the coding block.

In some embodiments, the processing circuitry determines the first range of the target motion vectors for the group of blocks along the first coordinate direction by determining one of an upper bound value and a lower bound value of the first range according to the base motion vectors for the group of blocks, and determining the other one of the upper bound value and the lower bound value of the first range according to an integer-pixel portion of the determined one of the upper bound value and the lower bound value, the first target difference, and a precision setting of the target motion vectors. In some embodiments, the processing circuitry converts the base motion vectors into the target motion vectors by keeping unchanged, regardless of the first range, at least one of three motion vectors for three blocks that correspond to a top-left sub-block, a top-right sub-block, and a bottom-left sub-block of the coding block in the picture, clipping a first value of another base motion vector, along the first coordinate direction, for another block in the group of blocks to the lower bound value in response to a determination that the first value is less than the lower bound value, and clipping the first value to the upper bound value in response to a determination that the first value is greater than the upper bound value.

In some embodiments, the processing circuitry further stores the base motion vectors for the group of blocks in a motion filed as reference information for a subsequent motion vector prediction process or a subsequent deblocking process.

In some embodiments, the first target difference is derived according to a video coding standard or signaled via the coded video bitstream. In some embodiments, the first target difference ranges from 0 to 3 integer pixels.

In some embodiments, the processing circuitry further determines a second range of the target motion vectors for the group of blocks along a second coordinate direction according to the base motion vectors and a second target difference for the second coordinate direction, the second range corresponding to limiting a difference of integer-pixel parts of two of the target motion vectors along the second coordinate direction to be equal to or less than the second target difference. The converting the base motion vectors into the target motion vectors can be performed according to the first range and the second range.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
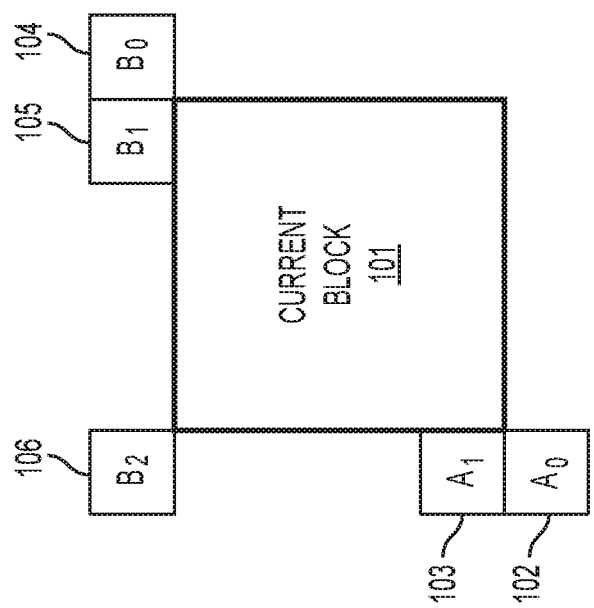
FIG. 1 is a schematic illustration of a current block and its surrounding spatial merge candidates in one example.
Figure 2:
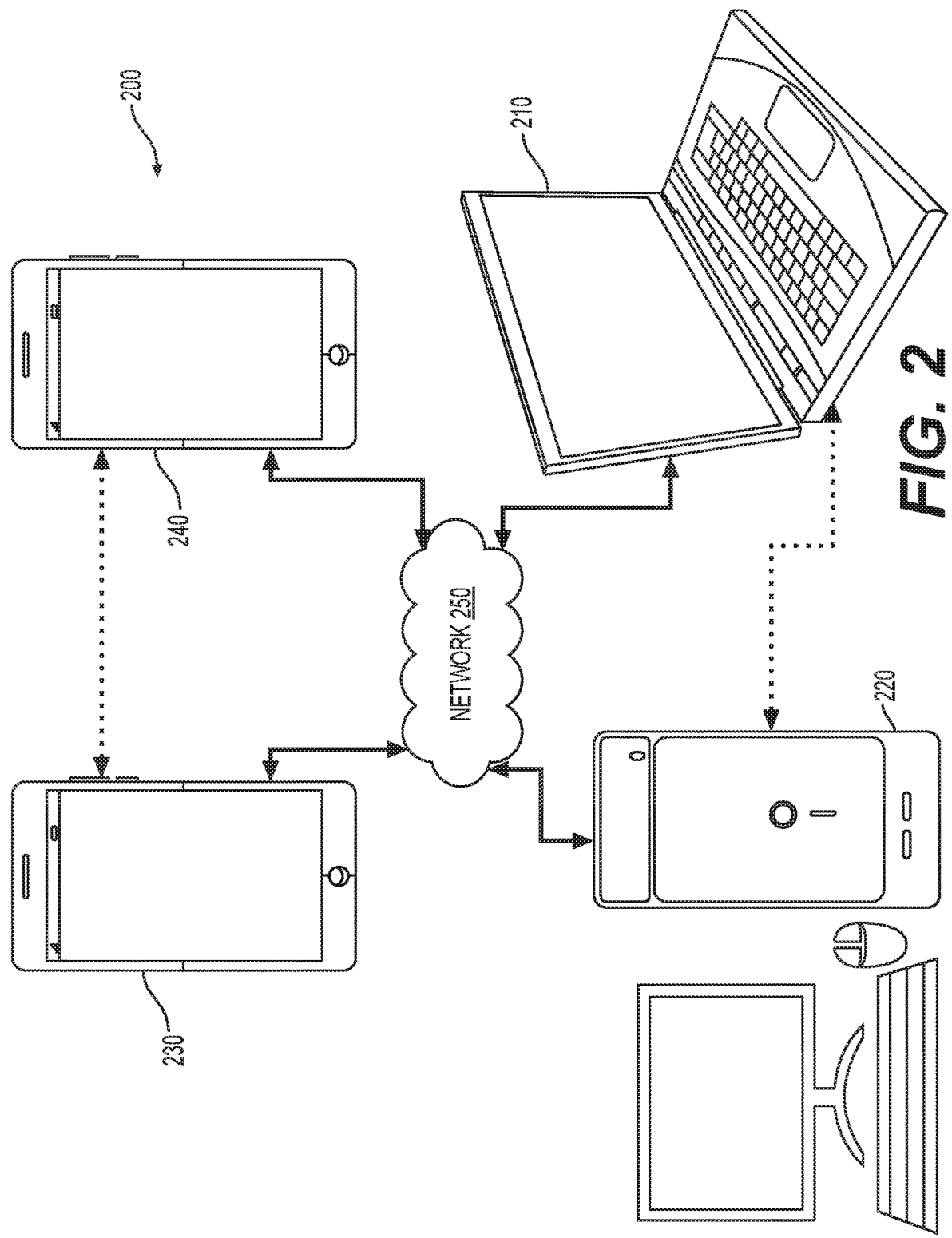
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
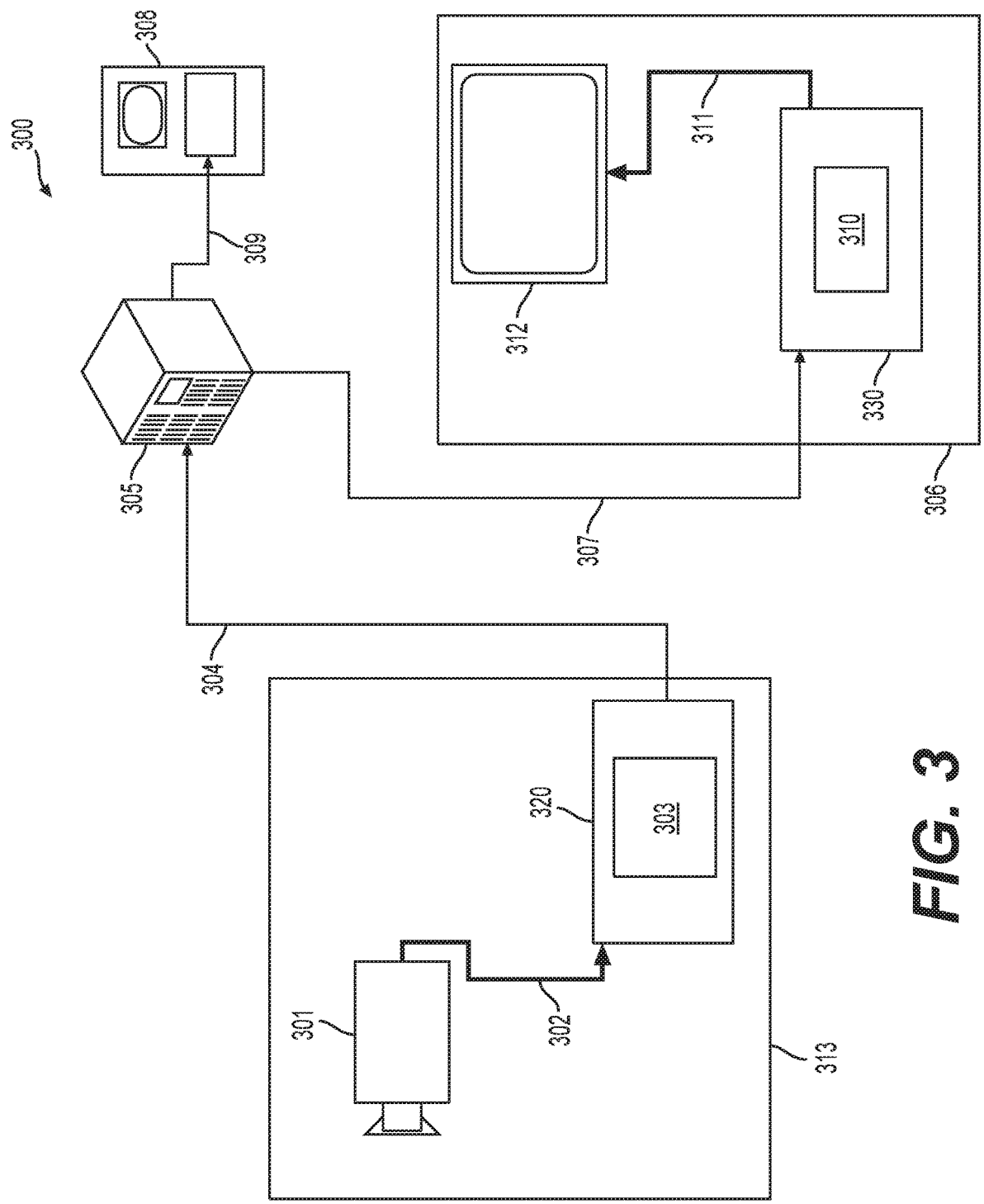
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
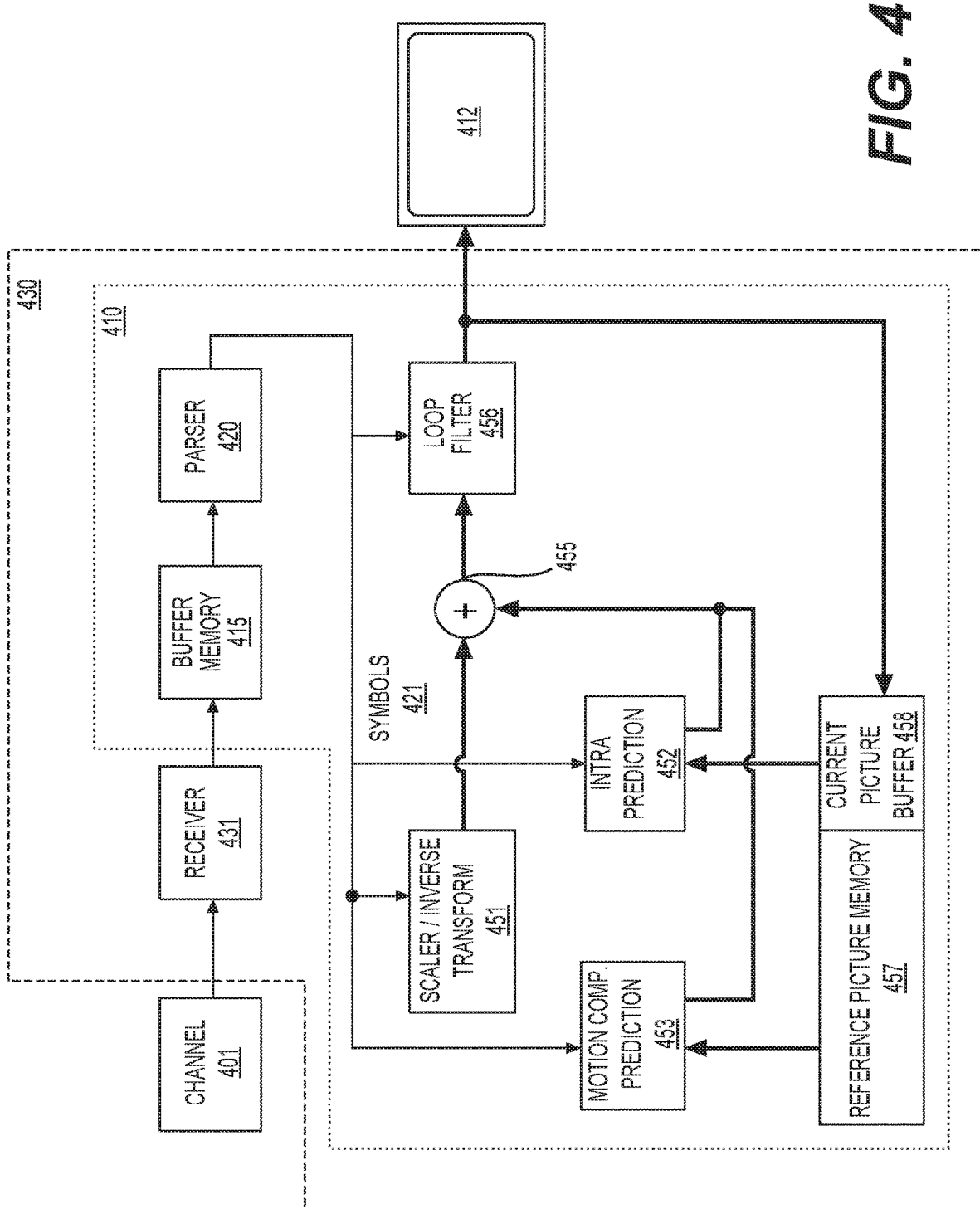
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another butler memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only took available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
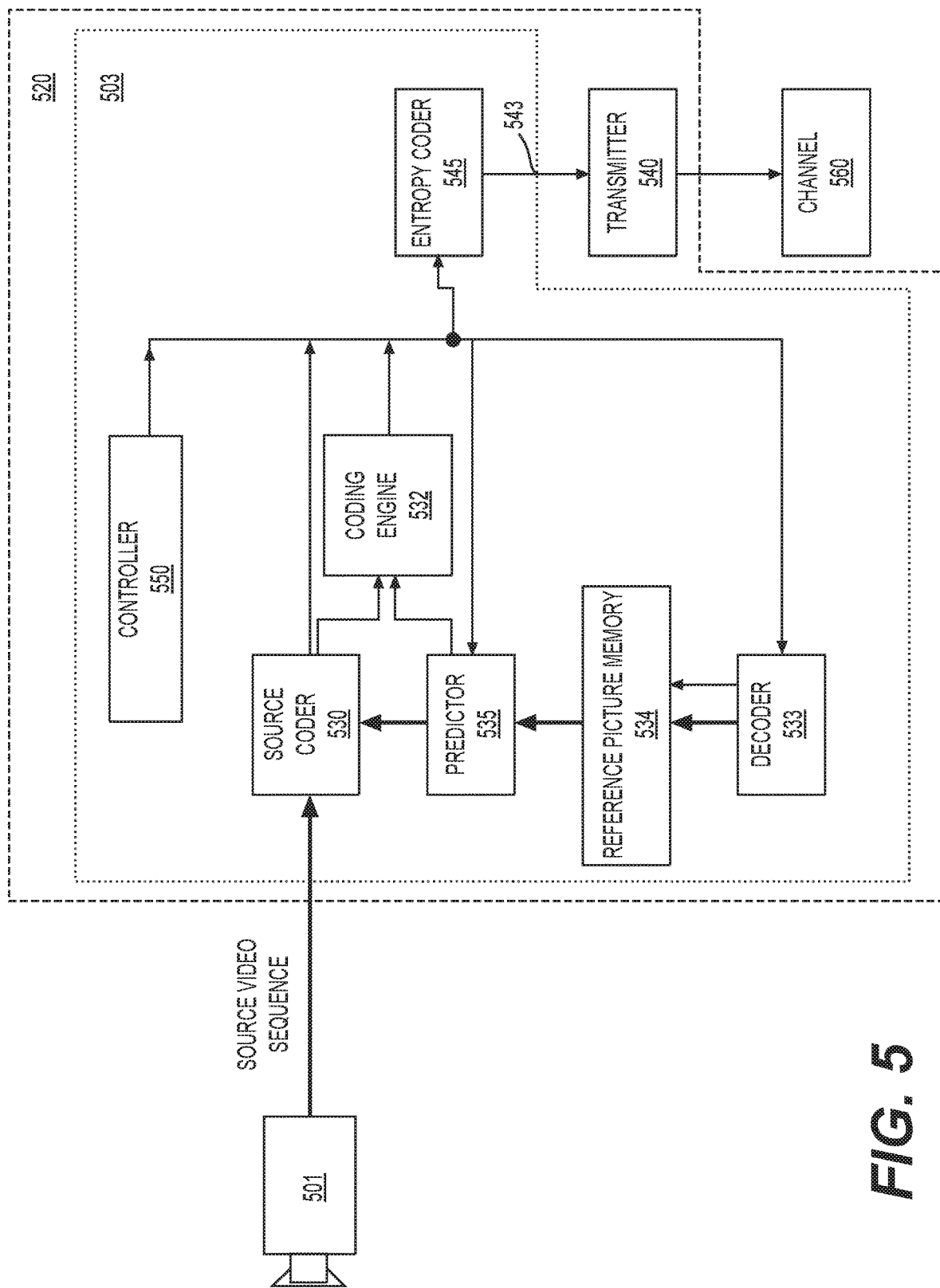
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
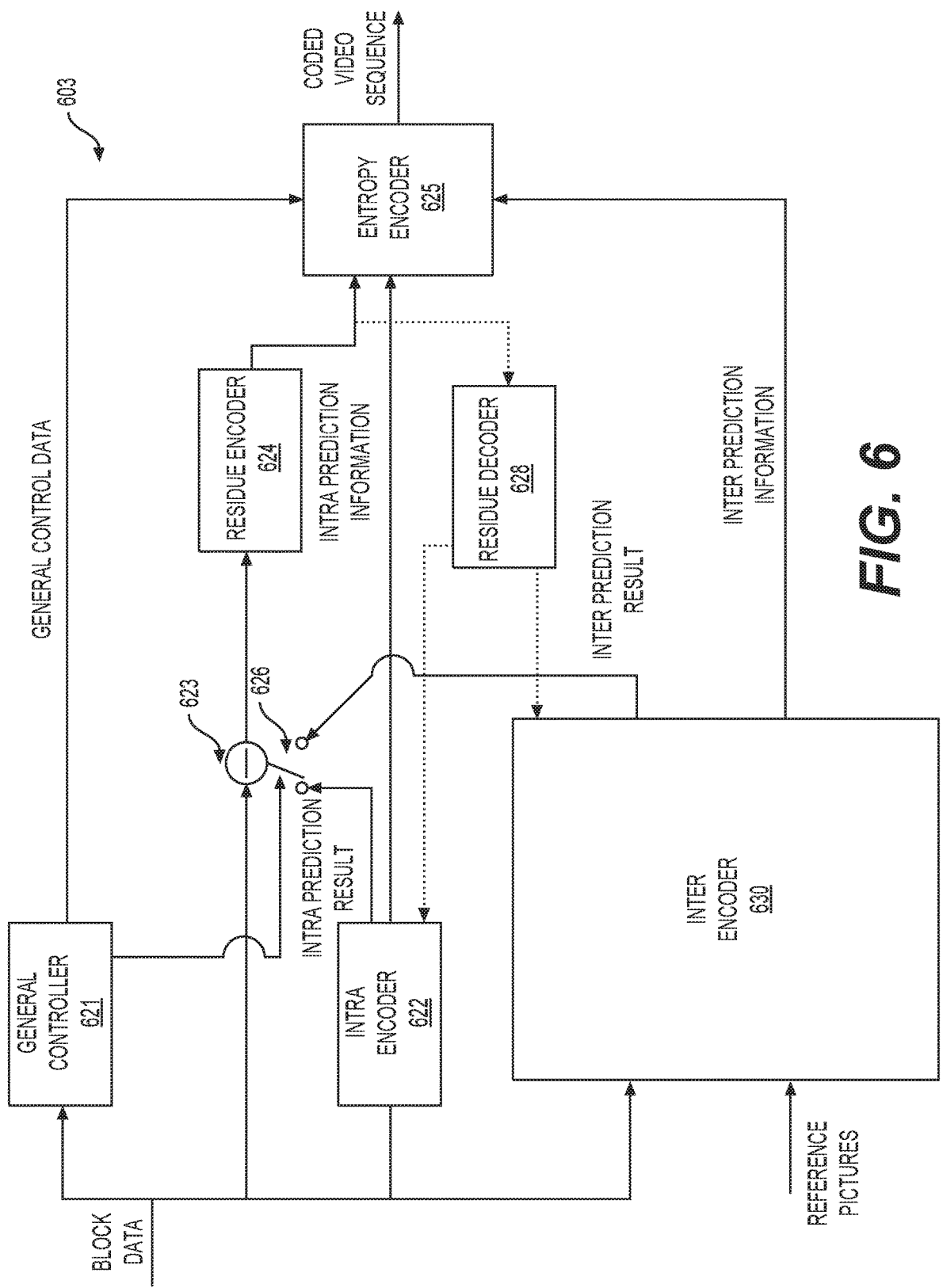
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
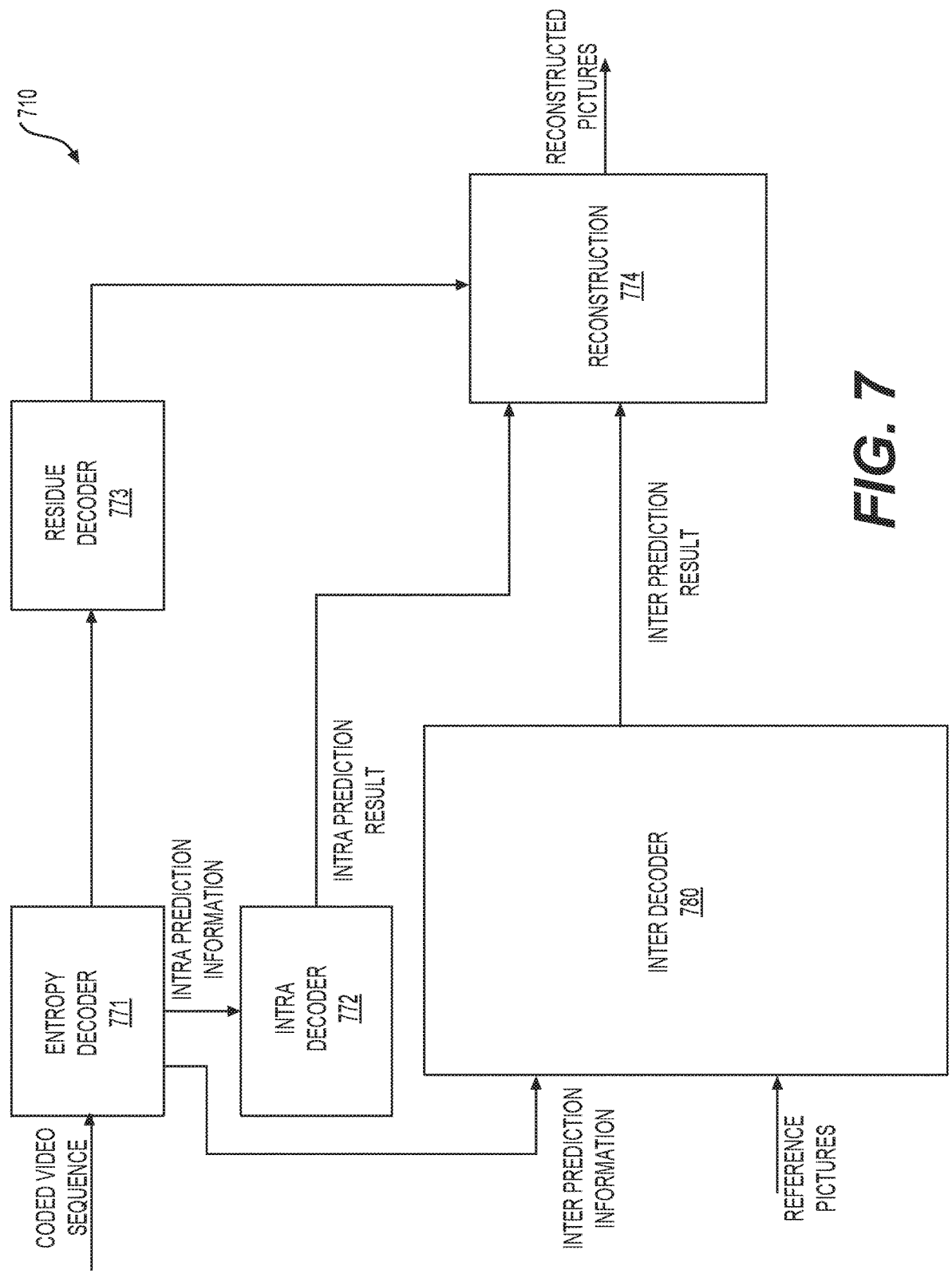
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

In some embodiments, a motion vector may have an integer-pixel precision such that the motion vector points to a pixel position for identifying a reference block. In some embodiments, a motion vector may have a fractional-pixel precision such that the motion vector points to a fractional pixel position for identifying a reference block. To calculate pixel values at fractional pixel positions, an interpolation filters may be used, which may require additional pixels outside the intended reference block for interpolation operations.

For example, in HEVC, to calculate pixel values at fractional pixel positions, 8-tap and 4-tap separable interpolation filters are used for luma and chroma components, respectively. For an M×N luma block interpolation, (M+7)× (N+7) luma samples need to be loaded from a reference picture according to the integer-pixel parts of the motion vectors. Accordingly, in HEVC, for a 4×4 luma uni-directional inter prediction, the decoder may need to load up to (4+7)×(4+7)=121 luma samples for performing the interpolation process. The per-pixel memory bandwidth requirement for this example is about 7.6 sample/pixel (121 samples for a 16-pixel block). Also, for a 4×4 luma bi-directional inter prediction, the requirement may double to become 15.125 sample/pixel.

In some embodiments, limiting the size of a block that is coded using inter prediction reduces the memory bandwidth requirement. For example, if the minimal block size of a block coded using the bi-directional inter prediction is limited to 8×8 pixels, the per-pixel memory bandwidth requirement can be reduced to 7.0 sample/pixel (450 samples for a 64-pixel block). Therefore, in some embodiments for inter prediction blocks smaller than 8×8, only uni-directional inter prediction is allowed.

Figure 8:
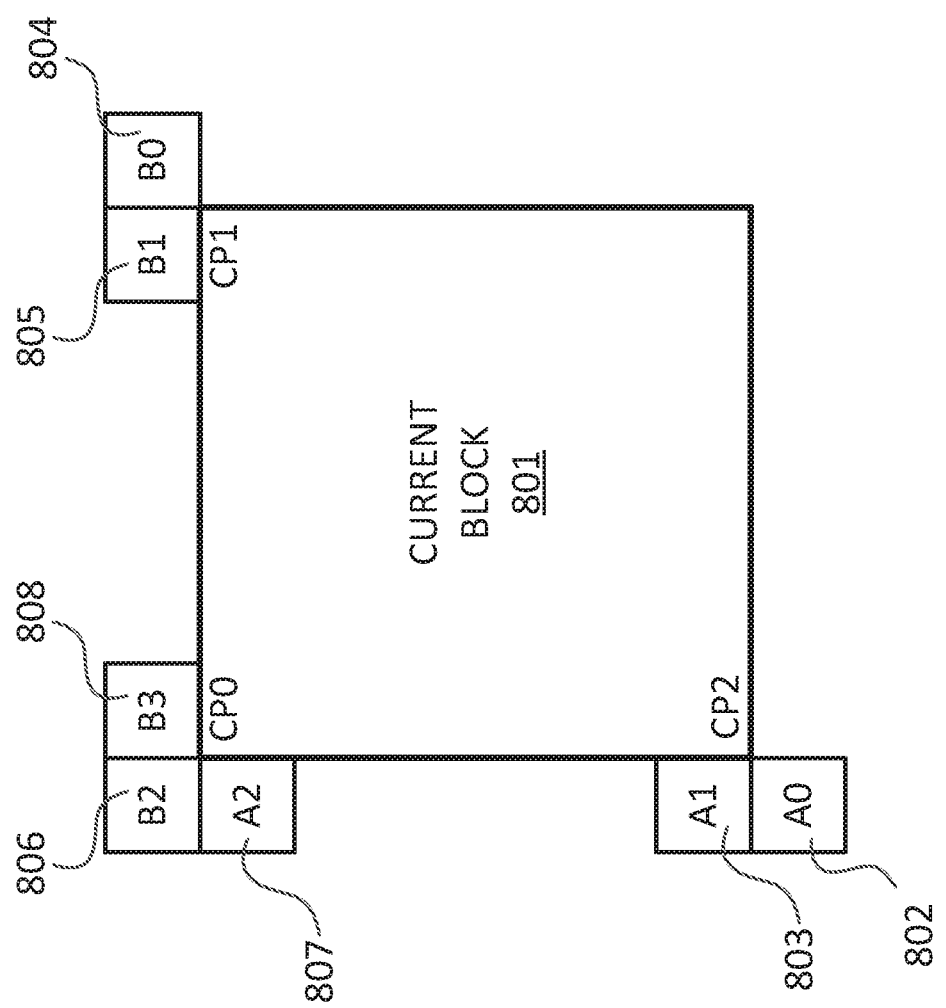
FIG. 8 is a schematic illustration of spatial neighboring blocks that can be used to determine motion information for a current block using an affine motion compensation method in accordance with an embodiment.

FIG. 8 is a schematic illustration of spatial neighboring blocks that can be used to determine motion information for a current block (801) using an affine motion compensation method in accordance with an embodiment. FIG. 8 shows a current block (801) and its spatial neighboring blocks denoted A0, A1, A2, B0, B1, B2, and B3 (802, 803, 807, 804, 805, 806, and 808, respectively). In some examples, spatial neighboring blocks A0, A1, A2, B0, B1, B2, and B3 and the current block (801) belong to a same picture.

Affine motion compensation, by describing a 6-parameter (or a simplified 4-parameter) model for a coding block, such as the current block (801), can efficiently predict the motion information for all samples within the current block with respect to a particular reference picture in a particular prediction direction. In some embodiments, in an affine coded or described coding block, different part of the samples can have different motion vectors with respect to the particular reference. The basic unit to have a motion vector in an affine coded or described block is referred to as a sub-block. The size of a sub-block can be as small as 1 sample only; and can be as large as the size of current block.

In some examples, an affine model uses 6 parameters to describe the motion information of an affine coded block, which can be represented by three motion vectors (also referred to as three control point motion vectors) at three different locations of the block (e.g., control points CP0, CP1, and CP2 at top-left, top-right, and bottom-left corners in FIG. 8). In another example, a simplified affine model uses four parameters to describe the motion information of an affine coded block, which can be represented by two motion vectors (also referred to as two control point motion vectors) at two different locations of the block (e.g., control points CP0 and CP1 at top-left and top-right corners in FIG. 8).

In some embodiments, the motion information for the control points CP0, CP1, and CP2 can be derived from motion information of the spatial neighboring blocks A0, A1, A2, B0, B1, B2, and B3. For example, the control points CP0 can be derived based on checking the motion information of the spatial neighboring blocks B2, A2, and B3; the control points CP1 can be derived based on checking the motion information of the spatial neighboring blocks B0 and B1; and the control points CP2 can be derived based on checking the motion information of the spatial neighboring blocks A0 and A1.

When an affine mode is determined, the motion vector (with respect to the particular reference picture) can be derived using such a model. In some embodiments, in order to reduce implementation complexity, the affine motion compensation is performed on a sub-block basis, instead of on a sample basis. Accordingly, in such embodiments, each sub-block within the current block (801) has a corresponding motion vector with respect to the particular reference that is applicable to all samples in the respective sub-block. In some examples, the representative location of each sub-block can be signaled or predetermined according to a video coding standard. In some examples, a location of a sub-block can be represented by a top-left or a center point of the sub-block. In an example using VVC, a sub-block may have a size of 4×4 samples.

Figure 9:
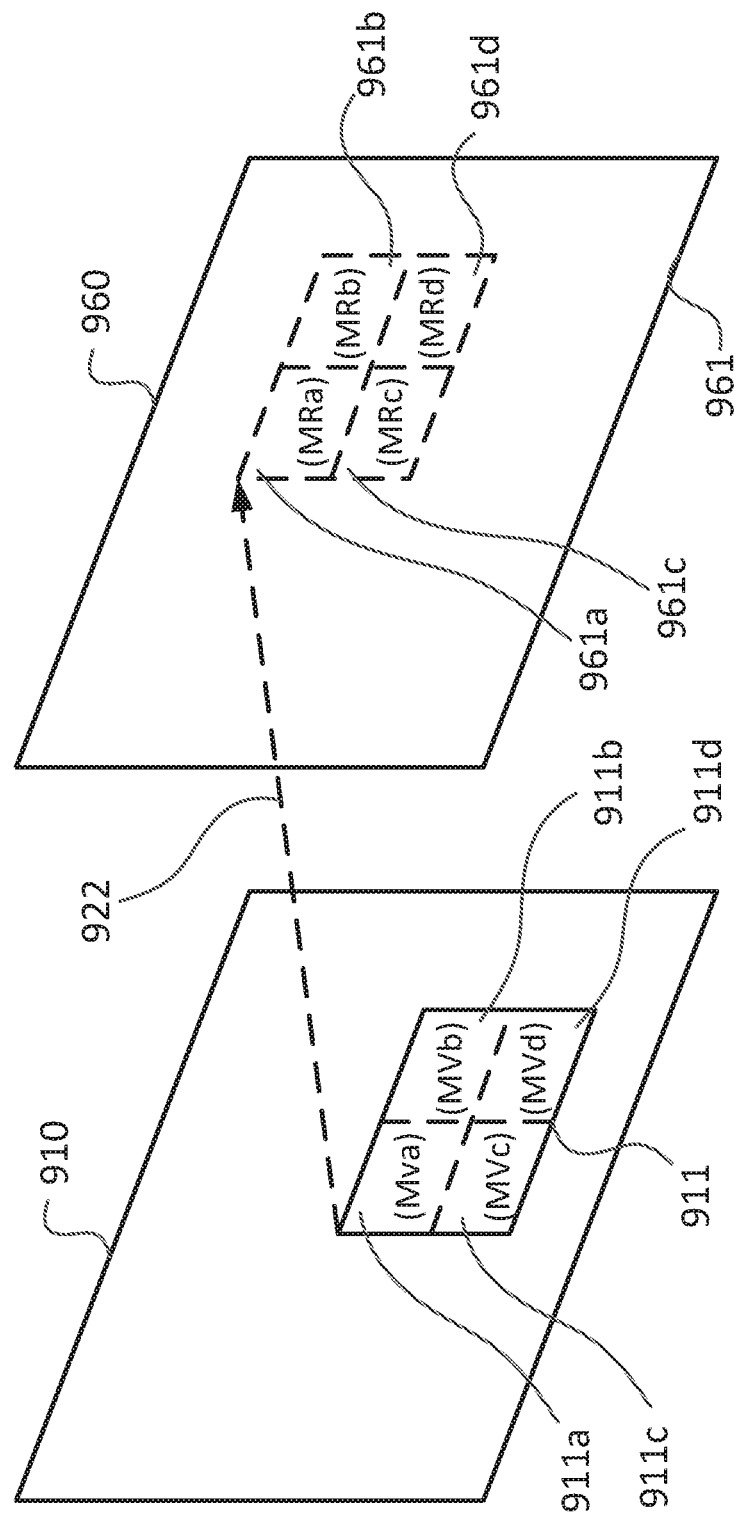
FIG. 9 is a schematic illustration of temporal reference blocks that can be used to determine motion information for a current block using an alternative temporal motion vector prediction method in accordance with one embodiment.

FIG. 9 is a schematic illustration of temporal reference blocks that can be used to determine motion information (including motion vectors and reference indices) for a current block (911) using a Sub-block temporal MV prediction (SbTMVP) method (or sometimes also referred to as an alternative temporal motion vector prediction (ATMVP) method) in accordance with one embodiment. In some examples, the SbTMVP method can be implemented by modifying the temporal motion vector prediction (TMVP) method by fetching multiple sets of motion information from blocks smaller than the current block (911).

FIG. 9 shows a current block (911) in a current picture (910) and a reference block (961) is in a reference picture (960). The reference block (961) can be identified based on a motion shift (or displacement) between the current block (911) and the reference block (961) indicated by a temporal vector (922). In some embodiments, the reference block (961) corresponds to a coding block in the reference picture (960). In some embodiments, the reference block (961) is just a counterpart region of the current block (911) in the reference picture (960) and does not correspond to any coding block in the reference picture (960).

Moreover, the current block (911) includes a plurality of sub-blocks (e.g., sub-blocks 911a, 911b, 911c, and 911d), and the reference block (961) includes a plurality of sub-blocks (e.g., sub-blocks 961a, 961b, 961c, and 961d) that corresponds to the counterpart regions of the sub-blocks (911a, 911b, 911c, and 911d) of the current block (911). The sub-blocks (911a, 911b, 911c, and 911d) include respective motion information (MVa, MVb, MVc, and MVd), and the sub-blocks (961a, 961b, 961c, and 961d) include respective reference motion information (MRa, MRb, MRc, and MRd). In some embodiments, each of the sub-blocks (911a, 911b, 911c, and 911d) has a size of 4×4 samples.

According to some embodiments that use SbTMVP methods, the motion information (MVa, MVb, MVc, and MVd) of the sub-blocks (911a, 911b, 911c, and 911d) within the current block (911) can be determined by identifying the corresponding reference block (961) in the reference picture (960) with the temporal vector (922), splitting the current block (911) into sub-blocks (911a, 911b, 911c, and 911d) and the reference block (961) into sub-blocks (961a, 961b, 961c, and 961d), obtaining the motion information (MRa, MRb, MRc, and MRd) of the sub-blocks (961a, 961b, 961c, and 961d), and determining the motion information (MVa, MVb, MVc, and MVd) of the sub-blocks (911a, 911b, 911c, and 911d) according to the motion information (MRa, MRb, MRc, and MRd) of the sub-blocks (961a, 961b, 961c, and 961d), respectively.

In some embodiments, the reference picture (960) and the corresponding reference block (961) can be determined by the motion information of the spatial neighboring blocks of the current block (910). In some embodiments, to avoid a repetitive scanning process for scanning the spatial neighboring blocks, a first merge candidate in a merge candidate list of the current block (911) can be used. The first available motion vector as well as a reference index associated with the first available motion vector are set to be the temporal vector (922) and the index to the reference picture (960). Accordingly, comparing the SbTMVP method to the TMVP method, the corresponding reference block (961) according to the SbTMVP method may be more accurately identified, while the corresponding reference block (sometimes called the collocated block) according to the TMVP method is set to a block corresponding to a bottom-right corner or a center position with respect to the current block.

Moreover, for each sub-block (911a, 911b, 911c, or 911d) of the current block (911), the motion information (MRa, MRb, MRc, or MRd) of the corresponding sub-block (961a, 961b, 961c, or 961d) in the reference picture (960) can be used to derive the corresponding motion information (MVa, MVb, MVc, or MVd) of the sub-block (911a, 911b, 911c, or 911d). In some embodiments, the motion information (MRa, MRb, MRc, and MRd) of the sub-blocks (961a, 961b, 961c, and 961d) corresponds to the motion information of the smallest motion grid in the reference picture (960) that covers the center sample of the respective sub-blocks (911a, 911b, 911c, and 911d). After the motion information (MRa, MRb, MRc, or MRd) of a sub-block (961a, 961b, 961c, or 961d) in the reference picture (960) is obtained, the motion information of a corresponding sub-block (911a, 911b, 911c, or 911d) of the current block (911) can be derived by converting the motion information (MRa, MRb, MRc, or MRd) in a manner similar to the TMVP method, including motion scaling and other suitable conversion process.

In some examples, when a low-delay condition (i.e., the POCs of all reference pictures of the current picture are smaller than the POC of the current picture) is met, a motion vector corresponding to one reference picture list (e.g., one of list 0 and list 1) can be used to predict motion vectors corresponding to another reference picture list (e.g., the other one of list 0 and list 1) for the sub-blocks of the current picture.

Figure 10A:
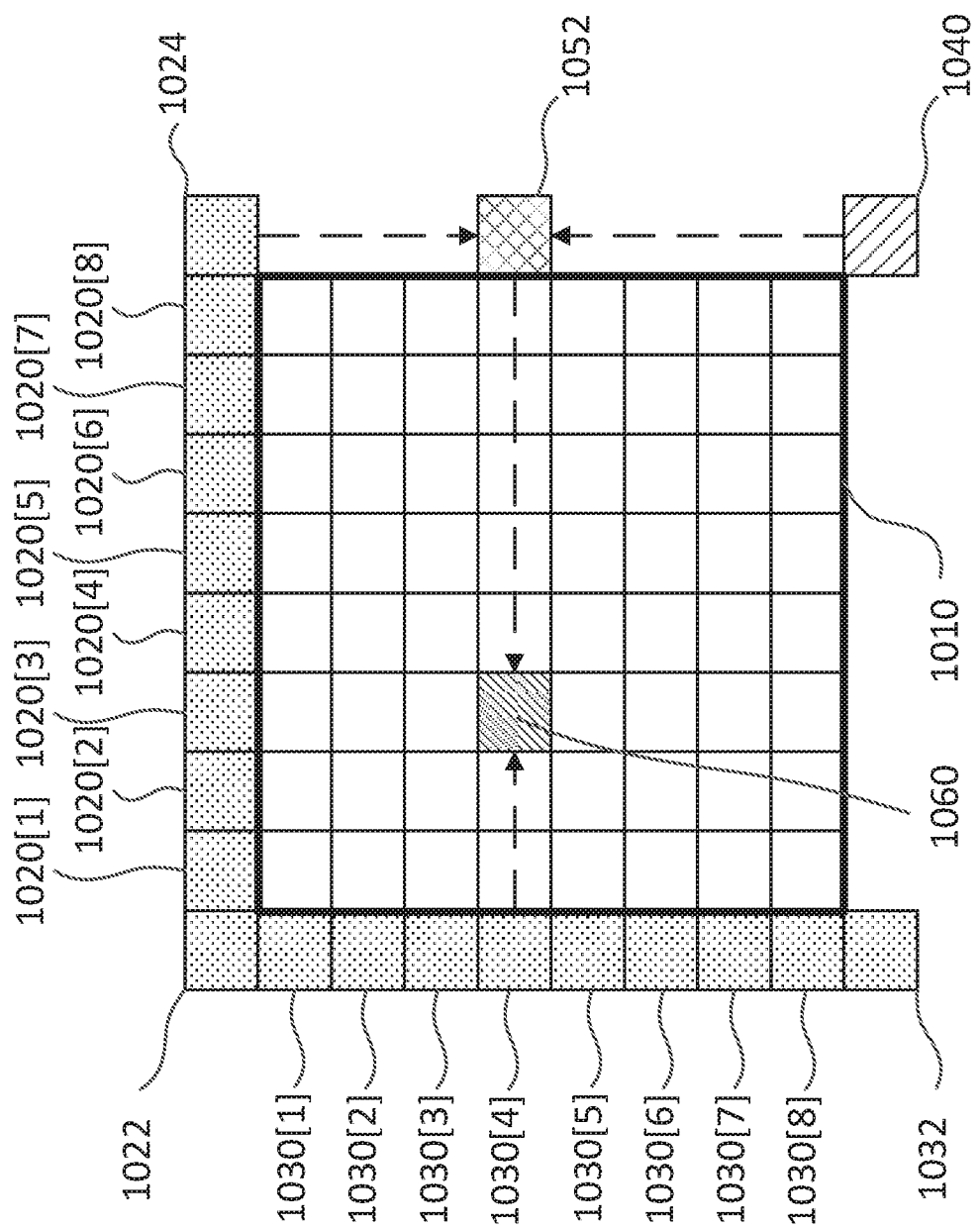
FIGS. 10A and 10B are schematics illustration of spatial neighboring blocks and a temporal neighboring block that can be used to determine motion information for a current block using a planar motion vector prediction method in accordance with an embodiment.
Figure 10B:
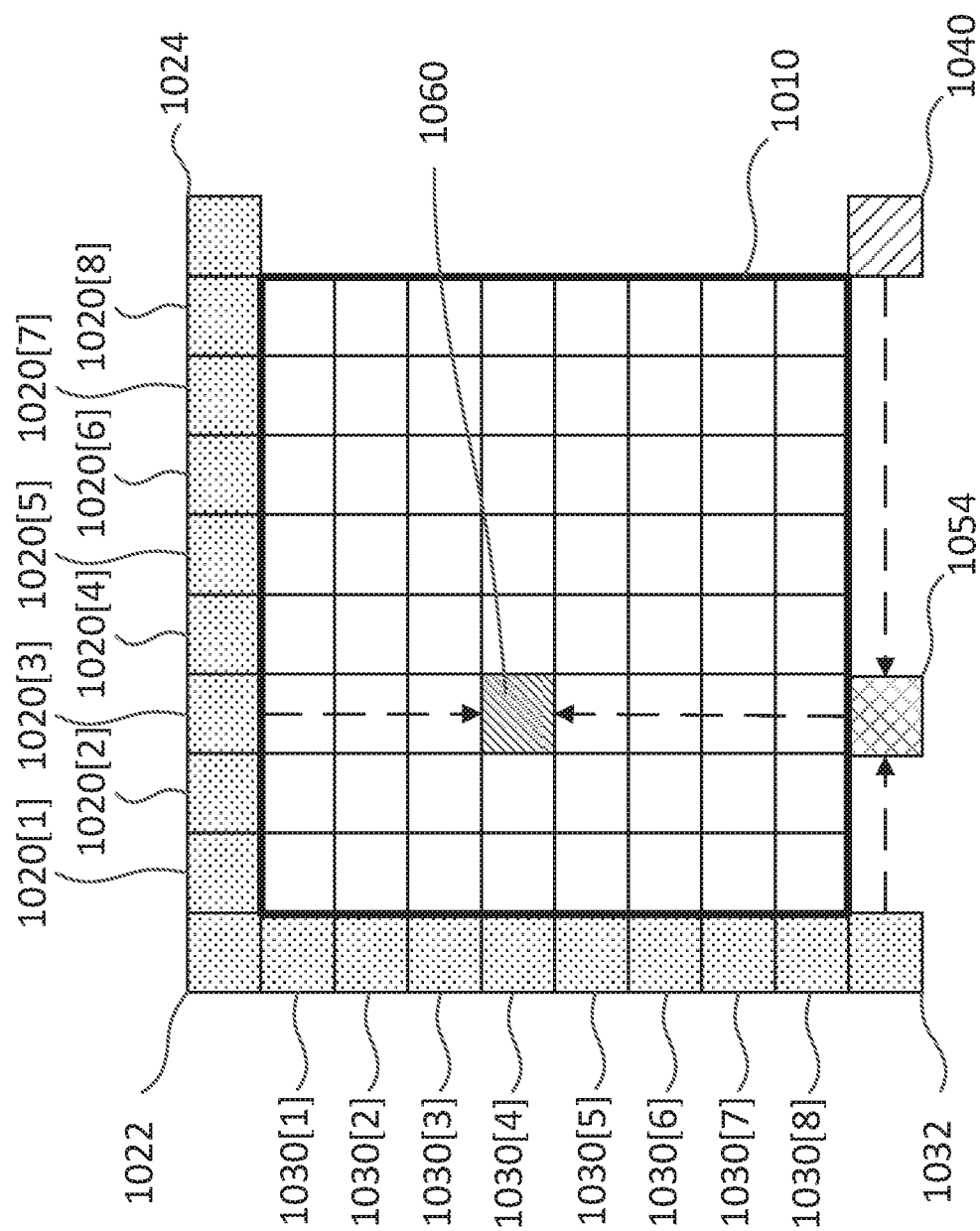

FIGS. 10A and 10B are schematics illustration of spatial neighboring blocks and a temporal neighboring block that can be used to determine motion information for a current block (1010) using a planar motion vector prediction method in accordance with an embodiment. In some embodiments, a motion vector obtained according to the planar motion vector prediction method can be used as a special merge candidate on a sub-block basis. The planar motion vector prediction method can be used to generate a smooth and fine granularity motion field.

As shown in FIGS. 10A and 10B, the current block (1010) has a size of width W and height H and includes 8×8 sub-blocks as an example, where each sub-block may have a size of 4×4 samples. In other embodiments, the current block (1010) can include a number of sub-blocks other than 8×8 sub-blocks, and each sub-block may have a size different from 4×4 samples. In FIGS. 10A and 10B, blocks 1020[1]~1020[8] are spatial neighboring blocks adjacent to an upper edge of the current block (1010); blocks 1030[1]~1030[8] are spatial neighboring blocks adjacent to a left edge of the current block (1010); block 1022 is a spatial neighboring blocks adjacent to a top-left corner of the current block (1010); block 1024 is a spatial neighboring blocks adjacent to a top-right corner of the current block (1010); and block 1032 is a spatial neighboring blocks adjacent to a bottom-left corner of the current block (1010). Moreover, block (1040) is a temporal neighboring blocks that is located at a position outside a region corresponding to the current block (1010) and adjacent to a bottom-right corner of the region.

As shown in FIG. 10A, in one example, a top-left corner of the current block (1010) has a position (0, 0) and a sub-block (1060) has a position (x, y). The left neighboring block (1030[4]), the sub-block (1060), and a right block (1052) are in a same row 'y,' where the right block (1052) has a position (W, y), where W corresponds to the width of block (1010). The motion information of the right block (1052) can be determined by interpolation based on the motion information of the neighboring block (1024) and the motion information of the temporal neighboring block (1040).

A horizontal motion vector prediction $P_h(x, y)$ for the sub-block (1060) at the position (x, y) in the current block (1010) can be calculated via a linear interpolation on a 4×4 block basis according to the following equation:

$$P_h(x,y)=(W-1-x) \times L(-1, y)+(x+1) \times R(W,y),$$

where L(−1, y) and R(W, y) represent the motion vectors of the left neighboring block (1030[4]) and the block (1052), respectively, where W corresponds to the width of block (1010).

In addition, as shown in FIG. 10B, in one example, top neighboring block (1020[3]), the sub-block (1060), and a bottom block (1054) are in a same column 'x,' where the block (1054) has a position (x, H), where H is the height of block (1010). The motion information of the bottom block (1054) can be determined by interpolation based on the motion information of the neighboring block (1032) and the motion information of the temporal neighboring block (1040).

A vertical motion vector prediction $P_v(x, y)$ for the sub-block (1060) at the position (x, y) in the current block (1010) can be calculated via a linear interpolation on a 4×4 block basis according to the following equation:

$$P_v(x,y)=(H-1-y) \times A(x, -1)+(y+1) \times B(x, H),$$

where A(x, −1) and B(x, H) represent the motion vectors of the block (1020[3]) and the block (1054), respectively, where H corresponds to the height of block (1010).

Referring to FIGS. 10A and 10B, a motion vector or a motion vector candidate can determined according to the planar motion vector prediction can be achieved by averaging the horizontal prediction $P_h(x, y)$ and the vertical prediction $P_v(x, y)$ to determine a planar motion vector P(x, y) according to the following equation:

$$P(x,y)=(H \times P_h(x,y)+W \times P_v(x,y)+H \times W)/(2 \times H \times W).$$

In some embodiments, the motion vector of the right neighboring block (1052) can be determined according to the following equation:

$$R(W,y)=((H-y-1) \times AR+(y+1) \times BR)/H,$$

where AR represent the motion vector of the block (1024), and BR represents the motion vector of the block (1054).

In some embodiments, the motion vector of the bottom neighboring block (1054) can be determined according to the following equation:

$$B(x,H)=((W-x-1) \times BL+(x+1) \times BR)/W,$$

where BL represent the motion vector of the block (1032), and BR represents the motion vector of the block (1054).

In some embodiments, for an inter prediction mode that uses sub-blocks, the smaller the sub-block size, the greater the memory bandwidth requirement per pixel is required, and such memory bandwidth requirements can be doubled for bi-directional inter prediction. However, the coding efficiency may decrease when the sub-block size is set to be a larger size. In some embodiments, the motion vectors of a group of sub-blocks (or a group of blocks) can be adjusted within a predetermined range, such that the reference samples for the group of sub-blocks (or the group of blocks) collectively can be processed as if it is for a consolidated block that covers the group of sub-blocks (or the group of blocks). Accordingly, in some embodiments, the coding scheme can benefit from both the precision of a smaller sub-block (or block) size and the reduced memory bandwidth requirement per pixel of a greater sub-block (or block) size. In some embodiments, the motion vector adjustment as described in this disclosure can improve the memory bandwidth requirement per pixel for a group of sub-blocks (or a group of blocks) of a size of 4×4 samples that are used for bi-directional inter-prediction.

In some embodiments, the motion vectors of a group of sub-blocks (e.g., sub-blocks of a coding unit, a coding block, or a prediction block) can be adjusted according to one or more of various motion vector adjustment schemes described herein. For the purpose of describing various motion vector adjustment schemes, a group of sub-blocks of a W×H inter block (having a size of width W and height H) is used as an example. In some embodiments, the motion vector adjustment schemes can also be applicable to a group of blocks, where the term of block may correspond to a coding unit, a coding block, or a prediction block.

In some embodiments, according to a first motion vector adjustment scheme, for a W×H inter block which is coded in a sub-block mode, such as affine, SbTMVP, planar MV prediction, etc., the motion vectors of the sub-blocks (i.e., sub-block MVs) inside a M×N block area (M<=W, N<=H) and pointing to a particular reference picture in a particular reference list can be checked and limited to a range such that the maximum absolute difference between the integer-pixel parts of the sub-block MVs along a particular coordinate direction is equal to or less than a target difference. For example, the motion vectors of sub-blocks in the M×N block area after the motion vector adjustment process, or also referred to as target motion vectors, can be limited to a range along the x coordinate direction such that a difference of integer-pixel parts thereof along the x coordinate direction is equal to or less than a target difference for the x coordinate direction. Additionally or alternatively, in some examples, the target motion vectors can be limited to a range along the y coordinate direction such that a difference of integer-pixel parts thereof along the y coordinate direction is equal to or less than a target difference for the y coordinate direction.

By adjusting the motion vectors as described herein, the reference samples to be loaded for the interpolation of all sub-blocks inside M×N block area block can be confined within an area defined by M, N, the interpolation tap (or interpolation taps if different taps are used for different coordinate directions), and the target difference (or target differences if different target differences are used for different coordinate directions). Accordingly, the maximum number of the total samples to be loaded for the group of sub-blocks can be reduced or at least more predictable for band-width management purposes.

The target difference or target differences, M, N, and/or sub-block size may be predefined, or signaled in a coded video bitstream, such as in a sequence parameter set (SPS) header, a picture parameter set (PPS) header, a slice header, a tile header, video usage information (VUI), or a supplemental enhancement information (SEI) message of the coded video bitstream.

In one example, M is set to 8 and N is set to 8, the sub-block size is 4×4 samples, and the target difference is set to 1 pixel for both the x coordinate direction and the y coordinate direction. Therefore, there are four 4×4 sub-blocks in an 8×8 block area. The maximum absolute difference of integer-pixel part in the x direction and in the y direction among all the four motion vectors of the four sub-blocks can be limited to not exceeding a target difference, which can be 1 integer pixel for each prediction list (e.g., List0 or Lsit1).

In some embodiments, the motion vectors of sub-blocks in an M×N block area, or also referred to as base motion vectors that are determined prior to a motion vector adjustment process, can be limited to a lower bound MVminx and an upper bound MVmaxx for components along the x coordinate direction and a lower bound MVminy and an upper bound MVmaxy for components along the y coordinate direction. The corresponding MVminx, MVmaxx, MVminy, and MVmaxy values can be determined for each M×N block area. In some examples, a motion vector (MVxi, MVyi) of a sub-block i inside an M×N block area can be clipped (or adjusted by truncation) according to max (MVminx, min(MVmaxx, MVxi)) along the x coordinate direction and max(MVminy, min(MVmaxy, MVyi)) along the y coordinate direction, where MVxi is an x coordinate direction component, MVyi is a y coordinate direction component, min(a, b) represents a lower value between a and b, and max(a, b) represents a greater value between a and b. Also, the absolute difference of the integer-pixel part of MVmaxx and the integer-pixel part of MVminx should be no greater than a target difference for the x coordinate direction, and the integer-pixel part of MVmaxy and the integer-pixel part of MVminy should be no greater than a target difference for the y coordinate direction.

In one example, (MVmaxx, MVmaxy) and (MVminx, MVminy) are determined by a particular one, single sub-block in the M×N block area, such as the first sub-block according to a decoding order. The motion vector of the first sub-block is denoted as (MVx1, MVy1). In some embodiments, (MVmaxx, MVmaxy) can be set to the maximum values that have the same integer value as (MVx1, MVy1), such as (((( MV$x$1>>MV_precision)+1)<<MV_precision)−1,
(((MV$y$1>>MV_precision)+1)<<MV_precision)−1).

(MVminx, MVminy) can be set to (MVmaxx−T, MVmaxy−T), where T is an offset value determined according to the target difference by $T$=((target difference+1)<<MV_precision)−1, wherein MV_precision indicates that the motion vector components and T are expressed in a unit $2^{MV\_precision}$ per pixel. For example, when the target difference is 1 pixel, MV_precision is 4, i.e., 1/16-pel precision, T is 31.

In another example, (MVmaxx, MVmaxy) and (MVminx, MVminy) are determined by the first sub-block in the M×N block area. (MVminx, MVminy) can be set to the minimum values that have the same integer value as (MVx1, MVy1), such as (MV$x$1>>MV_precision<<MV_precision,
MV$y$1>>MV_precision<<MV_precision).

(MVmaxx, MVmaxy) can be set to (MVminx+T, MVminy+T), and T can be determined as described above.

in another example, (MVmaxx, MVmaxy) and (MVminx, MVminy) are determined by more than one sub-blocks in the M×N block area, such as all sub-blocks in the M×N block area. The i-th motion vector of the i-th sub-block is denoted as (MVxi, MVyi). In some embodiments, (MVmaxx, MVmaxy) can be set to (int(max{MVxi})+(1<<MV_precision)−1, int(max{MVyi})+(1<<MV_precision)−1), and (MVminx, MVminy) can be set to be (MVmaxx−T, MVmaxy−T) can be determined as described above. Also, int(d) represents the integer-pixel part of d. For example, int(d) may be determined by int($d$)=($d$>>MV_precision)<<MV_precision.

In another example, (MVmaxx, MVmaxy) and (MVminx, MVminy) are determined by more than one sub-blocks in the M×N block area, such as all sub-blocks in the M×N block area. In some embodiments, (MVminx, MVminy) can be set to (int(min{MVxi}), int(min{MVyi})), and (MVmaxx, MVmaxy) can be set to be (MVminx+T, MVminy+T). T can be determined as described above.

In some embodiments, in one example, (MVmaxx, MVmaxy) and (MVminx, MVminy) can be determined by one or more particular sub-blocks in the M×N block area other than just the first sub-block or all sub-blocks as described above. For example, (MVmaxx, MVmaxy) and (MVminx, MVminy) can be determined by the first two sub-blocks in the M×N block area according to a decoding order or one or more sub-blocks at one or more predetermined positions in the M×N block area. In sonic examples, one of the sets of upper bounds or lower bounds can be set according to the corresponding maximum or minimum values of the motion vectors of the one or more particular sub-blocks, and the other one of the sets of upper bounds or lower bounds can be set according to the value T as described above.

In some embodiments, the motion vector adjustment process described herein can be applied to all sub-block based prediction modes. In some embodiments, the motion vector adjustment process described herein can be applied to only one or more selected sub-block based prediction modes. In one example, the motion vector adjustment process described herein can be applied only to affine blocks. In one example, the motion vector adjustment process described herein can be applied only to planar MV prediction mode. In one example, the motion vector adjustment process described herein can be applied to both affine and SbTMVP but not to planar MV prediction.

In some embodiments, the target difference can be different for the x coordinate direction component can be different from the target difference for the y coordinate direction component. In one example, when W=4, H>4, and the sub-block size is 4×4. The target difference for horizontal component (i.e., the x coordinate direction component) of a sub-block MV is 1 pixel and the target difference for vertical component (i.e., the y coordinate direction component) of sub-block MV is 2 pixels. In one example, when W>4, H=4, and the sub-block size is 4×4, the target difference for horizontal component (i.e., the x coordinate direction component) of a sub-block MV is 2 pixels and the target difference for vertical component (i.e., they coordinate direction component) of sub-block MV is 1 pixel.

In some embodiments, the motion vector adjustment process described herein can also be applicable to regular blocks in order to reduce the memory bandwidth requirement for blocks with a smaller size, such as a 4×4, 4×8, or 8×4 bi-directional predicted CU, which is not coded using a sub-block based prediction mode. In such examples, the motion vectors of a group of blocks may be constrained so that the absolute difference between the integer-pixel part of the motion vector of a current CU (CU_curr) along a particular coordinate direction and the integer-pixel part of the motion vector of a last inter coded CU (CU_inter_prev) along a particular coordinate direction is not greater than a target difference.

For the regular block application, in some embodiments, the target difference can be a fixed value, such as 1 pixel, regardless of a block size. In some embodiments, the target difference can be different for different block sizes, such as 1 pixel for 4×4 blocks, and 2 pixels for 8×4 or 4×8 blocks. In some embodiments, the target difference for the x coordinate direction component can be different from the target difference for the y coordinate direction component. In some embodiments, the target difference information may be signaled in a bitstream, such as in SPS, PPS, a slice header, a tile header, video usage information (VUI), or a supplemental enhancement information (SEI) message.

In one embodiment, if the last inter coded CU is not a spatial neighboring CU of the current CU, and the size of current CU is below a threshold, such as smaller than 8×8, the current CU may not be allowed to be coded using bi-directional prediction.

In some embodiments, the adjusted motion vectors of the sub-blocks (or also referred to as the target motion vectors of the sub-blocks) that are adjusted according to a motion vector adjustment process described herein may not be written back to a motion field. If a target motion vector of a sub-block is not written back to the motion field, the target motion vector can be used only for generating prediction samples for the sub-block. However, other modules in the video coding device, such as MV prediction and deblocking, can use the base motion vector (or the motion vector determined before adjustment described in this disclosure).

In some embodiments, the adjusted motion vectors of the sub-blocks (or the target motion vectors of the sub-blocks) may be written back to the motion field. If a target motion vector of a sub-block is written back to the motion field, other modules, such as MV prediction and deblocking, can use the target motion vector.

In some embodiments, whether to write back the target motion vector to the motion field may be predefined or signaled in a bitstream, such as in SPS, PPS, a slice header, a tile header, video usage information (VUI), or a supplemental enhancement information (SEI) message.

In some embodiments, in an affine inter mode and/or affine merge mode, the motion vectors of the control points from the spatial neighboring blocks are used in a MV prediction process. If the target sub-block MV(s) is written back to the motion field, the motion vectors used in MV prediction process according to the affine inter and merge modes are not the base motion vectors of the control points. In this case, the coding efficiency loss is big.

In some examples, for a W×H inter block which is coded using an affine inter or affine merge mode, the motion vectors corresponding to the top-left, top-right, and/or bottom-left sub-blocks can be used as control points for the affine inter or affine merge mode and thus can be kept unchanged regardless of the determined (MVmaxx, MVmaxy) and (MVminx, MVminy). In some embodiments, other sub-blocks inside an M×N block area (M<=W, N<=H) can still be adjusted according to one or more adjustment processes as described above, such that a difference of integer-pixel parts thereof along the x coordinate direction is equal to or less than a target difference for the x coordinate direction; and a difference of integer-pixel parts thereof along the y coordinate direction is equal to or less than a target difference for they coordinate direction.

In some examples, only one control point sub-block has its motion vector (MVxcp1, MVycp1) kept unchanged. In one example, after determining the (MVmaxx, MVmaxy) and (MVminx, MVminy) as described above, if MVxcp1 is larger than MVmaxx, then MVminx can be changed to (int(MVxcp1)−(threshold<<MV_precision)), and MVmaxx can be changed to (MVminx+T). In one example, if MVycp1 is larger than MVmaxy, then MVminy can be changed to (int(MVycp1)−(threshold<<MV_precision)), and MVmaxy can be changed to (MYminy+T). T can be determined as described above.

In one example, if W is 8, H is 8, and a sub-block size is 4×4, the (MVminx, MVmaxx) and (MVminy, MVmaxy) can be determined according to (MVxcp1, MVycp1). After the (MVminx, MVmaxx) and (MVminy, MVmaxy) are determined according to (MVxcp1, MVycp1), the upper and lower bounds can be used for clipping (or adjusting by truncation) the motion vectors of all sub-blocks in the 8×8 block area.

In some examples, two control point sub-blocks have their motion vectors (MVxcp1, MVycp1) and (MVxcp2, MVycp2) kept unchanged. In one example, the top-left sub-block MV and top-right sub-block MV are kept unchanged during the sub-block MV adjustment process. In one example, the top-left sub-block MV and bottom-left sub-block MV are kept unchanged during the sub-block MV adjustment process. In one example, the top-right sub-block MV and bottom-left sub-block MV are kept unchanged during the sub-block MV adjustment process. In these examples, for each M×N block area containing control point sub-block, the corresponding upper and lower bounds (MVminx, MVmaxx) and (MVminy, MVmaxy) can be determined according to the corresponding motion vector (MVxcp1, MVycp1) or (MVxcp2, MVycp2) that is within the sub-block and is kept unchanged.

In some examples, three control point sub-blocks have their motion vectors (MVxcp1, MVycp1), (MVxcp2, MVycp2), and (MVxcp3, MVycp3) kept unchanged. In these examples, for each M×N block area containing control point sub-block, the corresponding upper and lower bounds (MVminx, MVmaxx) and (MVminy, MVmaxy) can be determined according to the corresponding motion vector (MVxcp1, MVycp1), (MVxcp2, MVycp2), or (MVxcp3, MVycp3) that is within the sub-block and is kept unchanged.

In some embodiments, the adjusted motion vectors of the sub-blocks (or the target motion vectors of the sub-blocks) may be written back to the motion field. If a target motion vector of a sub-block is written back to the motion field, other modules, such as MV prediction and deblocking, can use the target motion vector.

In some embodiments, in an affine inter mode and/or affine merge mode, the motion vectors of the control points from the spatial neighboring blocks are used in a MV prediction process. If the target sub-block MV(s) is written back to the motion field, the motion vectors used in MV prediction process according to the affine inter and merge modes are not the base motion vectors of the control points. In this case, the coding efficiency loss is big.

In some embodiments, for an affine block, when constraining sub-block MVs in an M×N region to have the same integer part of MVs, the motion vector adjustment process may be modified for improved efficiency as further described below.

In some embodiments, for an M×N block area, an i-th motion vector of an i-th sub-block can be denoted as (MVxi, MVyi), and (MVminx, MVminy) and (MVmaxx, MVmaxy) can be determined based on the positions of max{MVxi}, max{MVyi}, min{MVxi}, and min{MVyi} with respect to the integer-pixel parts thereof. Because the process may be applicable to the x coordinate direction components and y coordinate direction components in a similar approach, the following pseudo code example is based on the x coordinate direction components:

motion vectors, along the first coordinate direction, for the group of blocks, and determining a minimum value of the base motion vectors, along the first coordinate direction, for the group of blocks. In response to a determination that a first difference between the minimum value and a first integer-pixel part of the minimum value is less than a second difference between the maximum value and a second integer-pixel part of the maximum value, the lower bound value of the range can be determined according to the minimum value of the base motion vectors, and the upper bound value of the range can be determined according to an integer-pixel portion of the determined lower bound value, the target difference, and a precision setting of the target motion vectors. Also, in response to a determination that the first difference is not less than the second difference, the upper bound value of the range can be determined according to the maximum value of the base motion vectors, and the lower bound value of the range can be determined according to an integer-pixel portion of the determined upper bound value, the target difference, and the precision setting of the target motion vectors.

In some embodiments, the process for the y coordinate direction components can be performed in a manner similar to the pseudo code example illustrated above, with the x coordinate direction related parameters replaced with y coordinate direction related parameters.

In some embodiments, the target difference for the x coordinate direction components can be different from the target difference for the y coordinate direction components. In one example, the same target difference is used for x coordinate direction components and y coordinate direction components. In one example, the target difference for both x coordinate direction components and y coordinate direction components is set to 0. In one example, the target difference for x coordinate direction component is set to 1, and the target difference for y coordinate direction components is set to 0.

In some embodiments, the sub-block MV adjustment processes described in this disclosure may be applicable when a block or a block area is bi-directional predicted. In at least one embodiment, the sub-block MV adjustment processes described in this disclosure may be applicable only when a block or a block area is bi-directional predicted or multi-hypothesis predicted using an affine mode.

```
    MVminx = min{MVxi}; // get minimum MV component of sub-block MVs of the
target reference list along a first coordinate direction (e.g., x coordinate direction)
    MVmaxx = max{MVxi}; // get maximum MV component of sub-block MVs of the
target reference list along the first coordinate direction (e.g., x coordinate direction)
    round.MVminx = MVminx >> MV precision << MV_precision; // get integer part of
MVminx
    roundMVmaxx = MVmaxx >> MV_precision << MV_precision; // get integer part
of MVmaxx
    if ((MVminx − roundMVminx) < (MVmaxx − roundMVmaxx))
    {// mainly use min{MVxi} for the clipping process when min{MVxi} is closer to an
roundMVminx
        MVminx = roundMVminx;
        MVmaxx = MVminx + T; // T is the office value as described above
    }
    else
    {// mainly use max{MVxi} for the clipping process when max{MVxi} is closer to
roundMVmaxx
        MVmaxx roundMVmaxx;
        MVminx = MVmaxx − T; // T is the office value as described above
    }
```

Therefore, the determining the range of the target motion vectors for the group of blocks along a particular coordinate direction include determining a maximum value of the base Moreover, sub-block MV adjustment processes described in this disclosure may be implemented by hard-wire circuitry, processing circuitry (e.g., one or more processors or one or more integrated circuits) executing a set of instructions, or a combination thereof. In one example, the one or more processors can execute the set of instructions that is stored in a non-transitory computer-readable medium.

Figure 11:
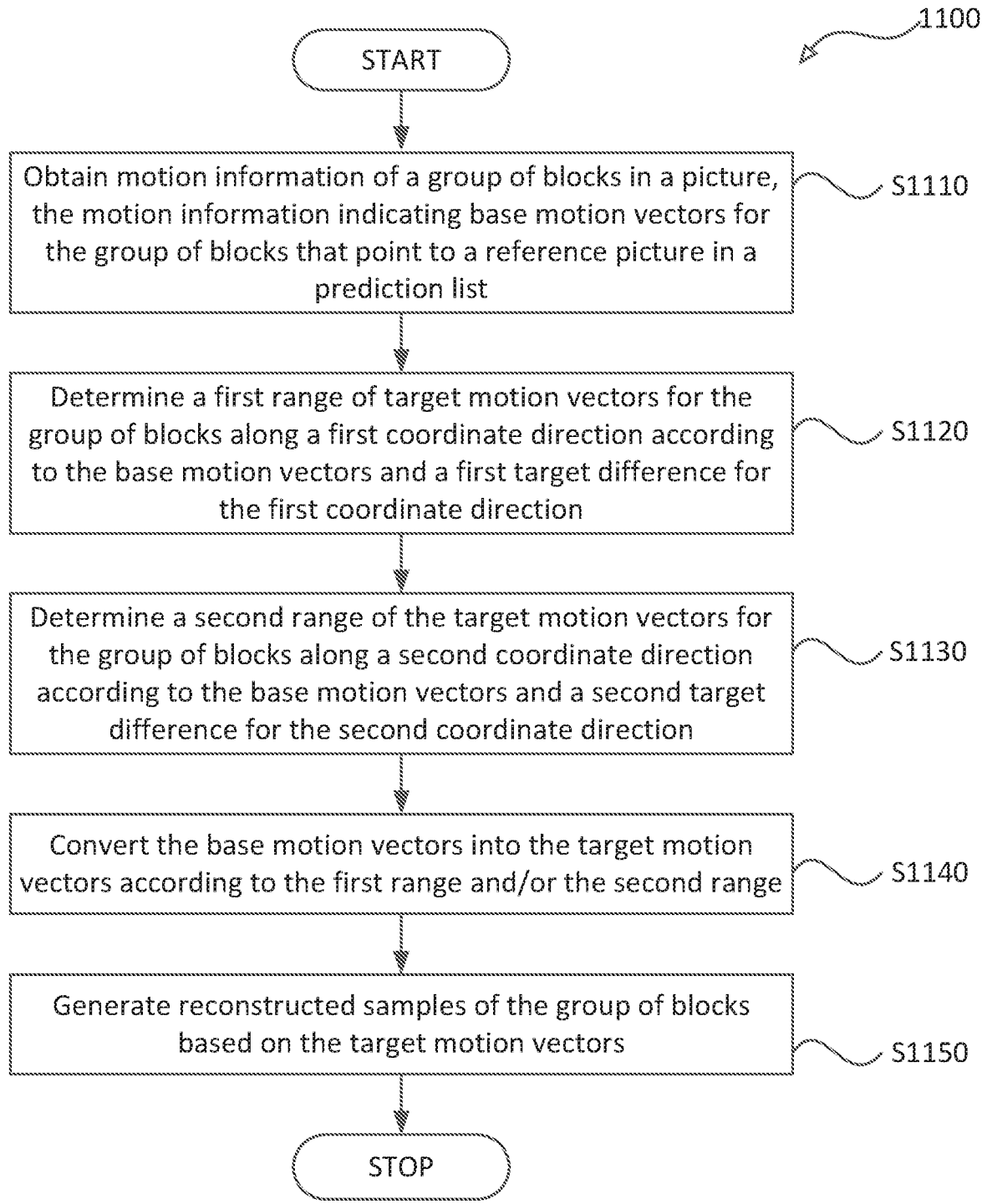
FIG. 11 is a flow chart outlining a process of reconstructing a group of blocks based on target motion vectors that comply with a set of constraints in accordance with one embodiment.

FIG. 11 is a flow chart outlining a process (1100) of reconstructing a group of blocks based on target motion vectors that comply with a set of constraints in accordance with one embodiment. The block in this flow chart can refer to a regular block or a sub-block. In some embodiments, one or more operations are performed before or after process (1100), and some of the operations illustrated in FIG. 11 may be reordered or omitted.

In various embodiments, the process (1100) is executed by processing circuitry, such as the processing circuitry in the terminal devices (210), (220), (230), and (240), the processing circuitry that performs functions of the video decoder (310), (410), or (710), the processing circuitry that performs functions of the video encoder (303), (503), or (603), and the like. In some embodiments, the process (1100) is implemented by software instructions, thus when the processing circuitry executes the software instructions, the processing circuitry performs the process (1100). The process starts at (S1110).

At (S1110), motion information of a group of blocks in a picture is obtained from a coded video bitstream. The motion information indicates base motion vectors for the group of blocks, and the base motion vectors point to a first reference picture in a first prediction list. In some embodiments, the group of blocks includes sub-blocks of a coding block in the picture. In some embodiments, the first target difference can be determined according to a size and a shape of the coding block. In some embodiments, the group of blocks includes regular blocks.

In some embodiments, the first target difference ranges from 0 to 3 integer pixels. In some embodiments, the first target difference can be derived according to a video coding standard or signaled via the coded video bitstream, such as in a sequence parameter set (SPS) header, a picture parameter set (PPS) header, a slice header, a tile header, video usage information (VUI), or a supplemental enhancement information (SEI) message of the coded video bitstream.

At (S1120), a first range of target motion vectors for the group of blocks along a first coordinate direction (e.g., the x coordinate direction or the horizontal direction) can be determined according to the base motion vectors and a first target difference for the first coordinate direction. As such, for any two motion vector within the first range, a difference of integer-pixel parts thereof along the first coordinate direction is equal to or less than the first target difference. The first range can be determined according to one or more motion vector adjustment processes as described above.

In some embodiments, the determining the first range of the target motion vectors for the group of blocks along the first coordinate direction includes determining one of an upper bound value and a lower bound value of the first range according to one or more base motion vectors for one or more particular blocks in the group of blocks, the one or more particular blocks corresponding to a respective one or more predetermined positions in the coding block. The other one of the upper bound value and the lower bound value of the first range can be determined according to the determined one of the upper bound value and an integer-pixel portion of the lower bound value, the first target difference, and a precision setting of the target motion vectors.

In some embodiments, the one or more particular blocks consist of a first block in the group of blocks according to a scanning order. In some embodiments, the one or more particular blocks consist of the first two blocks in the group of blocks according to a scanning order. In some embodiments, the one or more particular blocks include all sub-blocks in the group of blocks.

In some embodiments, the determining the first range of the target motion vectors for the group of blocks along the first coordinate direction includes determining the upper bound value of the first range according to a maximum value of the base motion vectors, along the first coordinate direction, for the group of blocks. In some embodiments, the determining the first range of the target motion vectors for the group of blocks along the first coordinate direction includes determining the lower bound value of the first range according to a minimum value of the base motion vectors, along the first coordinate direction, for the group of blocks.

In some embodiments, the determining the first range of the target motion vectors for the group of blocks along the first coordinate direction includes determining a maximum value of the base motion vectors, along the first coordinate direction, for the group of blocks, and determining a minimum value of the base motion vectors, along the first coordinate direction, for the group of blocks. In response to a determination that a first difference between the minimum value and a first integer-pixel part of the minimum value is less than a second difference between the maximum value and a second integer-pixel part of the maximum value, the lower bound value of the first range can be according to the minimum value of the base motion vectors, and the upper bound value of the first range can be determined according to an integer-pixel portion of the determined lower bound value, the first target difference, and a precision setting of the target motion vectors. In response to a determination that the first difference is not less than the second difference, the upper bound value of the first range can be determined according to the maximum value of the base motion vectors, and the lower bound value of the first range can be determined according to an integer-pixel portion of the determined upper bound value, the first target difference, and the precision setting of the target motion vectors.

At (S1130), a second range of target motion vectors for the group of blocks along a second coordinate direction (e.g., the y coordinate direction or the horizontal direction) can be determined according to the base motion vectors and a second target difference for the second coordinate direction. As such, for any two motion vector within the second range, a difference of integer-pixel parts thereof along the second coordinate direction is equal to or less than the second target difference. The second range can be determined according to one or more motion vector adjustment processes as described above and in a manner similar to the process for determining the first range along the first coordinate direction.

At (S1140), the base motion vectors of the group of blocks can be converted into the target motion vectors according to the first range and/or the second range. In some embodiments, the converting the base motion vectors into the target motion vectors includes clipping a first value of a base motion vector, along the first coordinate direction for example, for a block in the group of blocks to the lower bound value when the first value is less than the lower bound value; and clipping the first value to the upper bound value when the first value is greater than the upper bound value.

In some embodiments, the converting the base motion vectors into the target motion vectors includes keeping unchanged, regardless of the first range, at least one of three motion vectors for three blocks that correspond to a top-left sub-block, a top-right sub-block, and a bottom-left sub-block of the coding block in the picture.

At (S1150), reconstructed samples of the group of blocks are generated for output based on the target motion vectors. In some embodiments, after S1150, the base motion vectors for the group of blocks can be stored in a motion filed as reference information for a subsequent motion vector prediction process or a subsequent deblocking process.

After (S1150), the process terminates.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internets of things devices, and the like.

Figure 12:
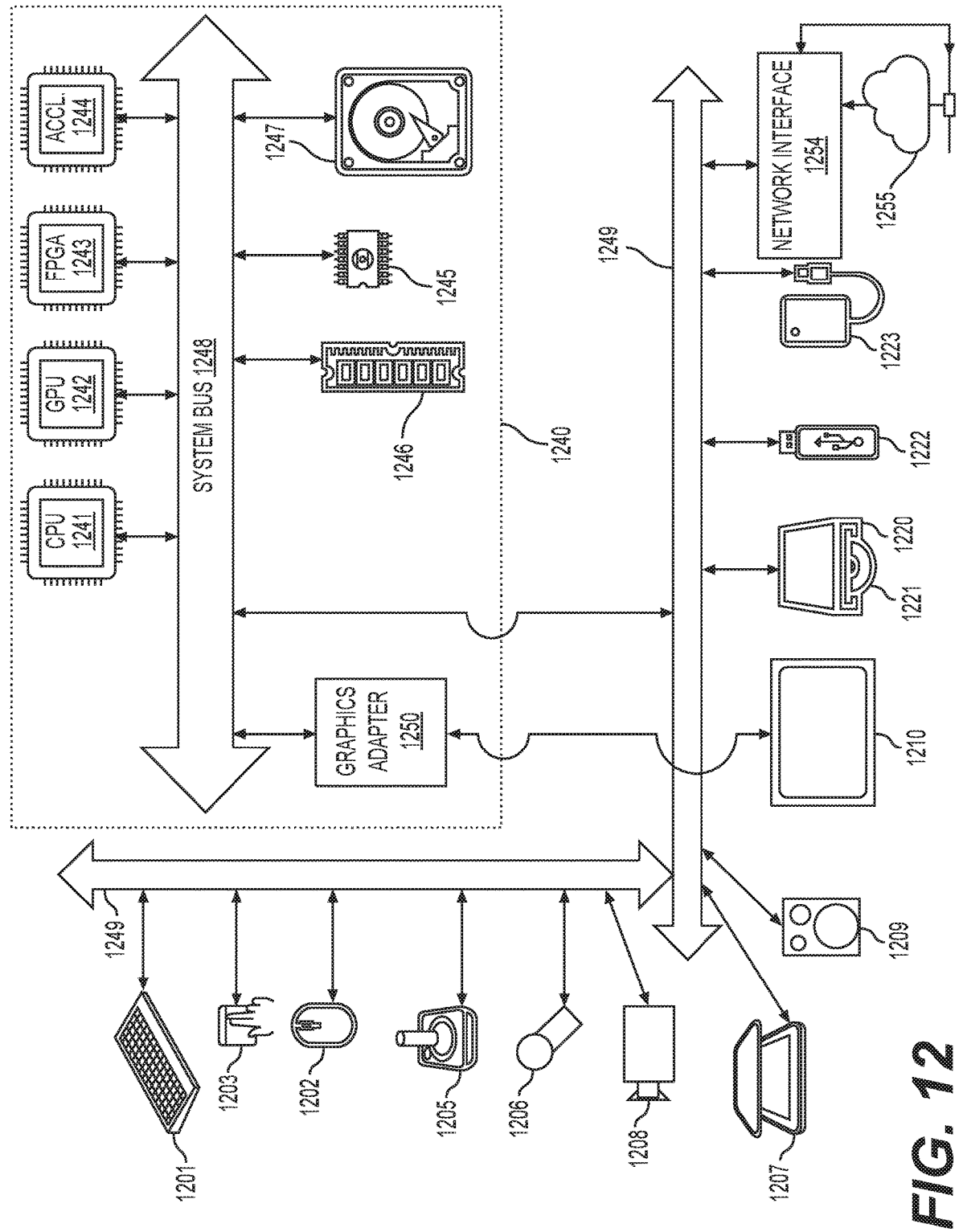
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hard-wired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
MVD: Motion Vector Difference
MVP: Motion Vector Prediction
CABAC: Context-Adaptive Binary Arithmetic Coding
MVP: Motion Vector Prediction
ATMVP: Advanced Temporal Motion Vector Prediction
SbTMVP: Sub-block temporal MV prediction
STMVP: Spatial-temporal Motion Vector Prediction
TMVP: Temporal Motion Vector Prediction
POC: Picture order count
DCTIF: Discrete Cosine Transform Interpolation Filter
MRSAD: Mean Reduced Sum of Average Difference
DMVD: decoder side motion vector derivation
DMVR: Decoder side motion vector refinement
VTM: Versatile Video Coding test model
HMVP: History-based Motion Vector Prediction
FIFO: First-In-First-Out
SPS: Sequence Parameter Set
PPS: Picture Parameter Set
SDR: Standard dynamic range
HDR: high dynamic range
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
JVET: Joint Video Exploration Team While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
obtaining motion information of a group of blocks in a picture from a coded video bitstream, the motion information indicating base motion vectors for the group of blocks, the base motion vectors pointing to a first reference picture in a first prediction list;
determining a first range of target motion vectors for the group of blocks along a first coordinate direction according to the base motion vectors and a first target difference for the first coordinate direction, the first range including an upper bound value and a lower bound value, wherein, for any two motion vectors within the first range, a difference of integer-pixel parts thereof along the first coordinate direction is equal to or less than the first target difference;
converting the base motion vectors for the group of blocks into the respective target motion vectors for the group of blocks according to the first range, including obtaining one of the target motion vectors from a respective one of the base motion vectors by:

clipping a first value of the one of the base motion vectors along the first coordinate direction to the lower bound value responsive to the first value being less than the lower bound value, and clipping the first value to the upper bound value responsive to the first value being greater than the upper bound value; and generating reconstructed samples of the group of blocks for output based on the target motion vectors, wherein the determining the first range of the target motion vectors for the group of blocks along the first coordinate direction comprises: determining one of the upper bound value and the lower bound value of the first range according to one or more base motion vectors for one or more particular blocks in the group of blocks, the one or more particular blocks corresponding to respective one or more predetermined positions in a coding block, and determining the other one of the upper bound value and the lower bound value of the first range according to an integer-pixel portion of the determined one of the upper bound value and the lower bound value, the first target difference, and a precision setting of the target motion vectors.

2. The method of claim 1, wherein the group of blocks includes sub-blocks of the coding block in the picture.

3. The method of claim 2, wherein the group of blocks includes four 4×4 sub-blocks within an 8×8 block area in the picture.

4. The method of claim 1, wherein the one or more particular blocks consist of a first block in the group of blocks according to a scanning order.

5. The method of claim 1, wherein the one or more particular blocks consist of first two blocks in the group of blocks according to a scanning order.

6. The method of claim 1, wherein the one or more particular blocks include all blocks in the group of blocks.

7. The method of claim 6, wherein
the determining the first range of the target motion vectors for the group of blocks along the first coordinate direction comprises performing one of:
determining the upper bound value of the first range according to a maximum value of the base motion vectors, along the first coordinate direction, for the group of blocks, and
determining the lower bound value of the first range according to a minimum value of the base motion vectors, along the first coordinate direction, for the group of blocks.

8. The method of claim 6, wherein
the determining the first range of the target motion vectors for the group of blocks along the first coordinate direction comprises:
determining a maximum value of the base motion vectors, along the first coordinate direction, for the group of blocks,
determining a minimum value of the base motion vectors, along the first coordinate direction, for the group of blocks,
in response to a determination that a first difference between the minimum value and a first integer-pixel part of the minimum value is less than a second difference between the maximum value and a second integer-pixel part of the maximum value,
(i) determining the lower bound value of the first range according to the minimum value of the base motion vectors, and (ii) determining the upper bound value of the first range according to an integer-pixel portion of the determined lower bound value, the first target difference, and a precision setting of the target motion vectors; and in response to a determination that the first difference is not less than the second difference,
(i) determining the upper bound value of the first range according to the maximum value of the base motion vectors, and
(ii) determining the lower bound value of the first range according to an integer-pixel portion of the determined upper bound value, the first target difference, and the precision setting of the target motion vectors.

9. The method of claim 1, further comprising:
determining the first target difference according to a size and a shape of the coding block.

10. The method of claim 2, wherein
the converting the base motion vectors into the target motion vectors further comprise:
keeping unchanged, regardless of the first range, at least one of three motion vectors for three blocks that correspond to a top-left sub-block, a top-right sub-block, and a bottom-left sub-block of the coding block in the picture.

11. The method of claim 1, further comprising:
storing the base motion vectors for the group of blocks in a motion field as reference information for a subsequent motion vector prediction process or a subsequent deblocking process.

12. The method of claim 1, wherein the first target difference is derived according to a video coding standard or signaled via the coded video bitstream.

13. The method of claim 1, wherein the first target difference ranges from 0 to 3 integer pixels.

14. The method of claim 1, further comprising
determining a second range of the target motion vectors for the group of blocks along a second coordinate direction according to the base motion vectors and a second target difference for the second coordinate direction, the second range corresponding to limiting a difference of integer-pixel parts of two of the target motion vectors along the second coordinate direction to be equal to or less than the second target difference,
wherein the converting the base motion vectors into the target motion vectors is performed according to the first range and the second range.

15. An apparatus, comprising:
processing circuitry configured to:
obtain motion information of a group of blocks in a picture from a coded video bitstream, the motion information indicating base motion vectors for the group of blocks, the base motion vectors pointing to a first reference picture in a first prediction list;
determine a first range of target motion vectors for the group of blocks along a first coordinate direction according to the base motion vectors and a first target difference for the first coordinate direction, the first range including an upper bound value and a lower bound value, wherein, for any two motion vectors within the first range, a difference of integer-pixel parts thereof along the first coordinate direction is equal to or less than the first target difference;
convert the base motion vectors for the group of blocks into the respective target motion vectors for the group of blocks according to the first range, including obtaining one of the target motion vectors from a respective one of the base motion vectors by:
  clipping a first value of the one of the base motion vectors along the first coordinate direction to the lower bound value responsive to the first value being less than the lower bound value, and
  clipping the first value to the upper bound value responsive to the first value being greater than the upper bound value; and
generate reconstructed samples of the group of blocks for output based on the target motion vectors,
wherein the processing circuitry is configured to
  determine one of the upper bound value and the lower bound value of the first range according to one or more base motion vectors for one or more particular blocks in the group of blocks, the one or more particular blocks corresponding to a respective one or more predetermined positions in a coding block, and
  determine the other one of the upper bound value and the lower bound value of the first range according to an integer-pixel portion of the determined one of the upper bound value and the lower bound value, the first target difference, and a precision setting of the target motion vectors.

16. The apparatus of claim 15, wherein the group of blocks includes sub-blocks of the coding block in the picture.

17. The apparatus of claim 15, wherein the one or more particular blocks include all blocks in the group of blocks.

18. A non-transitory computer-readable medium storing instructions which when executed by a computer for video decoding causes the computer to perform:
  obtaining motion information of a group of blocks in a picture from a coded video bitstream, the motion information indicating base motion vectors for the group of blocks, the base motion vectors pointing to a first reference picture in a first prediction list;
  determining a first range of target motion vectors for the group of blocks along a first coordinate direction according to the base motion vectors and a first target difference for the first coordinate direction, the first range including an upper bound value and a lower bound value, wherein, for any two motion vectors within the first range, a difference of integer-pixel parts thereof along the first coordinate direction is equal to or less than the first target difference;
  converting the base motion vectors for the group of blocks into the respective target motion vectors for the group of blocks according to the first range, including obtaining one of the target motion vectors from a respective one of the base motion vectors by:
    clipping a first value of the one of the base motion vectors along the first coordinate direction to the lower bound value responsive to the first value being less than the lower bound value, and
    clipping the first value to the upper bound value responsive the first value being greater than the upper bound value; and
  generating reconstructed samples of the group of blocks for output based on the target motion vectors,
  wherein the determining the first range of the target motion vectors for the group of blocks along the first coordinate direction comprises:
    determining one of the upper bound value and the lower bound value of the first range according to one or more base motion vectors for one or more particular blocks in the group of blocks, the one or more particular blocks corresponding to a respective one or more predetermined positions in a coding block, and
    determining the other one of the upper bound value and the lower bound value of the first range according to an integer-pixel portion of the determined one of the upper bound value and the lower bound value, the first target difference, and a precision setting of the target motion vectors.

19. The non-transitory computer-readable medium of claim 18, wherein the group of blocks includes sub-blocks of the coding block in the picture.

* * * * *